(12) United States Patent
Fukui

(10) Patent No.: US 11,077,754 B2
(45) Date of Patent: Aug. 3, 2021

(54) IN-VEHICLE CONTROL APPARATUS AND PROGRAM

(71) Applicant: HONDA MOTOR CO., LTD., Tokyo (JP)

(72) Inventor: Jiro Fukui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/829,150

(22) Filed: Mar. 25, 2020

(65) Prior Publication Data

US 2020/0307383 A1 Oct. 1, 2020

(30) Foreign Application Priority Data

Mar. 26, 2019 (JP) .............................. JP2019-058421

(51) Int. Cl.
*H02P 5/74* (2006.01)
*B60L 3/00* (2019.01)
(Continued)

(52) U.S. Cl.
CPC ......... *B60L 3/003* (2013.01); *H02M 7/53871* (2013.01); *H02P 5/74* (2013.01); *B60K 1/02* (2013.01)

(58) Field of Classification Search
CPC ........ B60L 3/003; H02P 7/53871; H02P 5/74; H02P 2201/07; H02P 29/024; H02M 7/53871
See application file for complete search history.

(56) References Cited

U.S. PATENT DOCUMENTS 8,476,865 B2 * 7/2013 Iwanaga ................. B60L 53/14
320/104
2011/0181104 A1 * 7/2011 Kamaga .................. B60L 50/61
307/9.1

(Continued)

FOREIGN PATENT DOCUMENTS

JP 2007-313982 12/2007

*Primary Examiner* — Rina I Duda
(74) *Attorney, Agent, or Firm* — Amin, Turocy & Watson, LLP

(57) ABSTRACT

An in-vehicle control apparatus includes: a first inverter; a second inverter; and a voltage conversion part configured to increase or decrease an operation voltage of one of the first inverter and the second inverter by an open-close control of a switch and supply the increased or decreased operation voltage as an operation voltage of another of the first inverter and the second inverter. The voltage conversion part includes: a reference voltage line; a low-voltage-side switch that is connected to and between the reference voltage line and a high-voltage-side power line of the second inverter; and a high-voltage-side switch that is connected to and between a high-voltage-side power line of the first inverter and a high-voltage-side power line of the second inverter. The in-vehicle control apparatus includes: a detection part that detects a short circuit failure of the low-voltage-side switch; and a control part that performs a phase short circuit control that short-circuits at least one of a plurality of low-voltage-side switches and a plurality of high-voltage-side switches of the second inverter upon detection of a short circuit failure of the low-voltage-side switch by the detection part.

5 Claims, 6 Drawing Sheets

(51) Int. Cl.
*H02M 7/5387* (2007.01)
*B60K 1/02* (2006.01)

(56) References Cited

U.S. PATENT DOCUMENTS

| | | | | |
|---|---|---|---|---|
| 2014/0240872 A1* | 8/2014 | Nomura | ................ | H02M 3/156 |
| | | | | 361/18 |
| 2016/0200355 A1* | 7/2016 | Mori | ................... | H02H 7/0844 |
| | | | | 180/446 |
| 2017/0113678 A1* | 4/2017 | Oba | ...................... | B60W 20/50 |

* cited by examiner

IN-VEHICLE CONTROL APPARATUS AND PROGRAM

CROSS-REFERENCE TO RELATED APPLICATION

Priority is claimed on Japanese Patent Application No. 2019-058421, filed on Mar. 26, 2019, the contents of which are incorporated herein by reference.

BACKGROUND

Field of the Invention

The present invention relates to an in-vehicle control apparatus and a program.

Background

In the related art, techniques relating to a drive control of an electric vehicle have been proposed (for example, refer to Japanese Unexamined Patent Application, First Publication No. 2007-313982).

SUMMARY

During traveling of the above electric vehicle as described in the related art, rotation of an axle may generate regeneration electric power. In such an electric vehicle, when a short circuit failure has occurred in a switch element that controls a drive current, a regeneration current flows into the switch element in which the short circuit failure has occurred, and an electrically conductive component or a cable connected to the switch element or the switch may enter an overheated state.

An object of an aspect of the present invention is to provide an in-vehicle control apparatus and a program capable of preventing a regeneration current from flowing into a switch element in which a short circuit failure has occurred.

A first aspect of the present invention is an in-vehicle control apparatus, including: a first inverter that drives a first motor for driving a vehicle; a second inverter that drives a second motor for driving the vehicle; and a voltage conversion part connected to and between the first inverter and the second inverter and configured to increase or decrease an operation voltage of one of the first inverter and the second inverter by an open-close control of a switch and supply the increased or decreased operation voltage as an operation voltage of another of the first inverter and the second inverter, wherein the voltage conversion part includes: a reference voltage line that connects a low-voltage-side power line of the first inverter to a low-voltage-side power line of the second inverter; a low-voltage-side switch that is connected to and between the reference voltage line and a high-voltage-side power line of the second inverter; and a high-voltage-side switch that is connected to and between a high-voltage-side power line of the first inverter and the high-voltage-side power line of the second inverter, and the in-vehicle control apparatus includes: a detection part that detects a short circuit failure of the low-voltage-side switch; and a control part that performs a phase short circuit control that short-circuits at least one of a plurality of low-voltage-side switches and a plurality of high-voltage-side switches of the second inverter upon detection of the short circuit failure of the low-voltage-side switch by the detection part.

A second aspect of the present invention is the in-vehicle control apparatus according to the first aspect described above, wherein the control part may perform the phase short circuit control prior to a stop control that stops the vehicle upon detection of a short circuit failure of the high-voltage-side switch by the detection part.

A third aspect of the present invention is the in-vehicle control apparatus according to the first or second aspect described above, wherein the detection part may be configured as a device having a separate body from the second inverter.

A fourth aspect of the present invention is a non-transitory computer-readable recording medium including a program that causes a computer of an in-vehicle control apparatus, including: a first inverter that drives a first motor for driving a vehicle; a second inverter that drives a second motor for driving the vehicle; and a voltage conversion part that is connected to and between the first inverter and the second inverter and includes a reference voltage line that connects a low-voltage-side power line of the first inverter to a low-voltage-side power line of the second inverter, a low-voltage-side switch that is connected to and between the reference voltage line and a high-voltage-side power line of the second inverter, and a high-voltage-side switch that is connected to and between a high-voltage-side power line of the first inverter and a high-voltage-side power line of the second inverter, the voltage conversion part being configured to increase or decrease an operation voltage of one of the first inverter and the second inverter by an open-close control of a switch and supply the increased or decreased operation voltage as an operation voltage of another of the first inverter and the second inverter, to execute: a detection step of detecting a short circuit failure of the low-voltage-side switch; and a control step of performing a phase short circuit control that short-circuits at least one of a plurality of low-voltage-side switches and a plurality of high-voltage-side switches of the second inverter upon detection of a short circuit failure of the low-voltage-side switch in the detection step.

According to the first to fourth aspects described above, it is possible to prevent a regeneration current from flowing into a switch element in which a short circuit failure has occurred.

DESCRIPTION OF THE EMBODIMENTS

Embodiment

Hereinafter, an embodiment of an in-vehicle control apparatus 10 of the present invention will be described with reference to the drawings.

Figure 1:
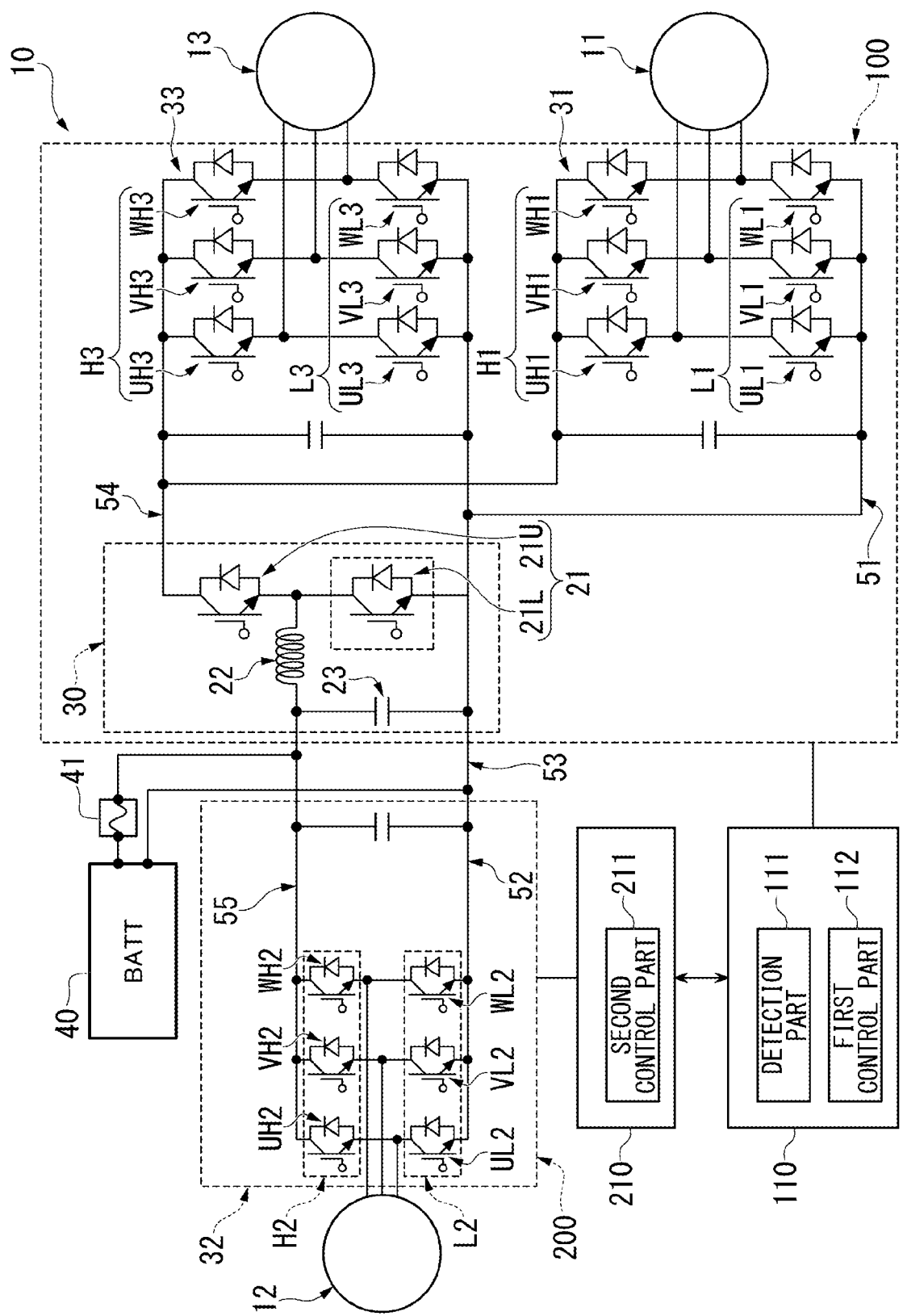
FIG. 1 is a view showing an example of a configuration of an in-vehicle control apparatus according to the present embodiment.

FIG. 1 is a view showing an example of a configuration of the in-vehicle control apparatus 10 according to the present embodiment. The in-vehicle control apparatus 10 of the present embodiment is mounted on an electric vehicle or the like. Examples of the electric vehicle include an electric automobile, a hybrid vehicle, a fuel-cell vehicle, and the like. The electric automobile is driven using a battery as a power source.

The hybrid vehicle is driven using a battery and an internal combustion engine as a power source. The fuel-cell vehicle is driven using a fuel cell as a power source.

The present embodiment is described using an example in which the in-vehicle control apparatus 10 is mounted on a four-wheel electric automobile including a first motor 11 that drives two front wheels and a second motor 12 that drives two rear wheels. The four-wheel electric automobile shown in the example is simply referred to as a vehicle in the following description.

The configuration of a vehicle is not limited to this example. For example, the vehicle may include four drive motors that independently drive each wheel, or may include two drive motors that independently drive two front wheels and one drive motor that drives two rear wheels (that is, three drive motors).

[Vehicle Configuration]

The vehicle includes the in-vehicle control apparatus 10, the first motor 11, the second motor 12, a third motor 13, and a battery 40.

The battery 40 supplies electric power for traveling of the vehicle and electric power that drives an auxiliary machine mounted on the vehicle. The battery 40 includes an excess-current breaker 41 that breaks an output current of the battery 40.

The first motor 11 is a motor for driving the vehicle and provides a drive force to the front wheel of the vehicle.

The second motor 12 is a motor for driving the vehicle and provides a drive force to the rear wheel of the vehicle.

The third motor 13 is a motor for electric power generation and is connected to be driven, for example, to an internal combustion engine. The third motor 13 generates electric power that charges the battery 40, operation electric power of the auxiliary machine of the vehicle, and the like by an electromotive force generated by a drive force of the internal combustion engine.

In an example of the present embodiment, the first motor 11, the second motor 12, and the third motor 13 are all three-phase AC motors.

[Configuration of in-Vehicle Control Apparatus 10]

The in-vehicle control apparatus 10 includes a front motor system 100, a rear motor system 200, a front motor control device 110, and a rear motor control device 210.

[Configuration of Front Motor System 100]

The front motor system 100 includes a DC-DC converter 30, a first inverter 31, and a third inverter 33.

The first inverter 31 drives the first motor 11 (that is, the front wheel motor) for driving the vehicle by converting supplied DC electric power into three-phase AC electric power. The first inverter 31 includes a high-side arm H1 and a low-side arm L1. The high-side arm H1 includes a high-side U-phase switch UH1, a high-side V-phase switch VH1, and a high-side W-phase switch WH1. The low-side arm L1 includes a low-side U-phase switch UL1, a low-side V-phase switch VL1, and a low-side W-phase switch WL1.

Since the configuration of the third inverter 33 is similar to that of the first inverter 31, the description thereof is omitted.

The DC-DC converter 30 (voltage conversion part) is connected to and between the first inverter 31 and the second inverter 32.

The DC-DC converter 30 increases or decreases an operation voltage of one of the first inverter 31 and the second inverter 32 by an open-close control of a switch and supplies the increased or decreased operation voltage as an operation voltage of another of the first inverter 31 and the second inverter 32.

In an example of the present embodiment, the DC-DC converter 30 is a so-called step-up/down converter and includes a voltage increase-decrease switch 21, a reactor 22, and a capacitor 23.

That is, the DC-DC converter 30 has a function of increasing a voltage when supplying electric power from the second inverter 32 side to the first inverter 31 and the third inverter 33 side, and a function of decreasing a voltage when supplying electric power from the first inverter 31 and the third inverter 33 side to the second inverter 32 side.

The voltage increase-decrease switch 21 is constituted of a high-voltage-side switch 21U and a low-voltage-side switch 21L.

The high-voltage-side switch 21U is connected to a first-inverter high-voltage-side power line 54, one end of the reactor 22, and a high-voltage-side terminal of the low-voltage-side switch 21L. The first-inverter high-voltage-side power line 54 is a power line on the high-side arm H1 side of the first inverter 31.

The low-voltage-side switch 21L is connected to a first-inverter low-voltage-side power line 51, one end of the reactor 22, and a low-voltage-side terminal of the high-voltage-side switch 21U. The first-inverter low-voltage-side power line 51 is a power line on the low-side arm L1 side of the first inverter 31.

The first-inverter low-voltage-side power line 51 and the second-inverter low-voltage-side power line 52 are connected to each other. The second-inverter low-voltage-side power line 52 is a power line on the low-side arm L2 side of the second inverter 32.

In the following description, the first-inverter low-voltage-side power line 51 and the second-inverter low-voltage-side power line 52 are collectively referred to as a reference voltage line 53. In other words, the reference voltage line 53 connects the first-inverter low-voltage-side power line 51 to the second-inverter low-voltage-side power line 52.

The capacitor 23 is connected to and between another end of the reactor 22 and the reference voltage line 53.

One end of the reactor 22 is connected to a connection point between the high-voltage-side switch 21U and the low-voltage-side switch 21L. Another end of the reactor 22 is connected to a second-inverter high-voltage-side power line 55 which is a power line on the high-side arm H2 side of the second inverter 32.

The high-voltage-side switch 21U is connected to the second-inverter high-voltage-side power line 55 via the reactor 22. In other words, the high-voltage-side switch 21U is connected to and between the first-inverter high-voltage-side power line 54 and the second-inverter high-voltage-side power line 55.

The low-voltage-side switch 21L is connected to the second-inverter high-voltage-side power line 55 via the reactor 22. In other words, the low-voltage-side switch 21L is connected to and between the reference voltage line 53 and the second-inverter high-voltage-side power line 55.

The DC-DC converter 30 supplies electric power output by the battery 40 to the first inverter 31. The DC-DC converter 30 supplies electric power generated by the third inverter 33 to the battery 40. The DC-DC converter 30 performs electric power conversion of drive electric power used for acceleration of the vehicle and regeneration electric power generated in accordance with deceleration of the vehicle.

[Configuration of Rear Motor System 200]

The rear motor system 200 includes the second inverter 32.

The second inverter 32 drives the second motor 12 (that is, the rear wheel motor) for driving the vehicle by converting supplied DC electric power into three-phase AC electric power. The second inverter 32 has a configuration similar to the first inverter 31. Specifically, the second inverter 32 includes a high-side arm H2 and a low-side arm L2. The high-side arm H2 includes a high-side U-phase switch UH2, a high-side V-phase switch VH2, and a high-side W-phase switch WH2.

The low-side arm L2 includes a low-side U-phase switch UL2, a low-side V-phase switch VL2, and a low-side W-phase switch WL2.

[Configuration of Control Device]

The configuration of the front motor control device 110 and the rear motor control device 210 will be described. Each part included in the front motor control device 110 and the rear motor control device 210 may be a hardware function part that functions by an integrated circuit or the like, or may be a software function part that functions by executing a predetermined program by a processor such as a CPU (Central Processing Unit). The software function part is an ECU (Electronic Control Unit) including a processor such as a CPU, a ROM (Read-Only Memory) that stores a program, a RAM (Random-Access Memory) that temporarily stores data, and an electronic circuitry such as a timer.

The front motor control device 110 controls the front motor system 100 while cooperating with the rear motor control device 210 through communication between the front motor control device 110 and the rear motor control device 210.

Specifically, the front motor control device 110 includes a microcomputer and includes a detection part 111 and a first control part 112 as a functional part of the front motor control device 110.

The detection part 111 and the first control part 112 may be constituted of hardware or may be constituted of software.

The detection part 111 detects a short circuit failure of the low-voltage-side switch 21L. As an example, the detection part 111 detects whether or not the low-voltage-side switch 21L is in a short circuit failure on the basis of a combination of an ON (conduction)/OFF (cutoff) state of the low-voltage-side switch 21L with a value of current flowing through the low-voltage-side switch 21L. The short circuit failure is a failure in which a current flows through the low-voltage-side switch 21L when the low-voltage-side switch 21L is controlled to the OFF state.

A current flowing through the low-voltage-side switch 21L when the low-voltage-side switch 21L is controlled to the OFF state is referred to as a short circuit current.

Specifically, the detection part 111 detects a short circuit failure when the value of current (that is, a short circuit current value) flowing through the low-voltage-side switch 21L in a case where the low-voltage-side switch 21L is in the OFF state is larger than a predetermined threshold value.

The above embodiment is described using an example in which the detection part 111 detects the short circuit failure on the basis of the value of current; however, the embodiment is not limited thereto. For example, the detection part 111 may detect a short circuit failure on the basis of a potential difference between both ends of the low-voltage-side switch 21L.

The first control part 112 controls the front motor system 100 by switching between ON and OFF states of a switching element included in each of the DC-DC converter 30, the first inverter 31, and the second inverter 32 on the basis of a predetermined control condition.

When the detection part 111 detects a short circuit failure of the low-voltage-side switch 21L, the first control part 112 notifies the rear motor control device 210 that the short circuit failure is detected.

The rear motor control device 210 includes a second control part 211.

The second control part 211 performs a phase short circuit control that short-circuits at least one of a plurality of low-voltage-side switches and a plurality of high-voltage-side switches of the second inverter 32.

The plurality of low-voltage-side switches of the second inverter 32 are, for example, switches on the low-side arm L2 side (the low-side U-phase switch UL2, the low-side V-phase switch VL2, and the low-side W-phase switch WL2).

The plurality of high-voltage-side switches of the second inverter 32 are, for example, switches on the high-side arm H2 side (the high-side U-phase switch UH2, the high-side V-phase switch VH2, and the high-side W-phase switch WH2).

In an example of the present embodiment, the second control part 211 causes a three-phase short circuit by controlling all of the switches (the low-side U-phase switch UL2, the low-side V-phase switch VL2, and the low-side W-phase switch WL2) of the low-side arm L2 of the second inverter 32 to be in an ON state.

The second control part 211 may cause a two-phase short circuit by controlling both of two phases selected from the switches of each phase to be in an ON state. A phase in which an electromotive force occurs among the phases of the second motor 12 varies by the minute due to rotation of a rotor (not shown) of the second motor 12. In this case, the second control part 211 causes a two-phase short circuit by selecting two phases in which an electromotive force is generated from the phases of the second motor 12.

The above embodiment is described using an example in which the detection part 111 is part of the front motor control device 110; however, the embodiment is not limited thereto. The detection part 111 may be part of the front motor system 100. The front motor control device 110 is a device having a separate body from the second inverter 32. That is, the detection part 111 is a device having a separate body from the second inverter 32.

[Operation of in-Vehicle Control Apparatus 10]

Next, an example of an operation of the in-vehicle control apparatus 10 is described with reference to FIG. 2 to FIG. 4.

[Operation of Front Motor Control Device 110]

Figure 2:
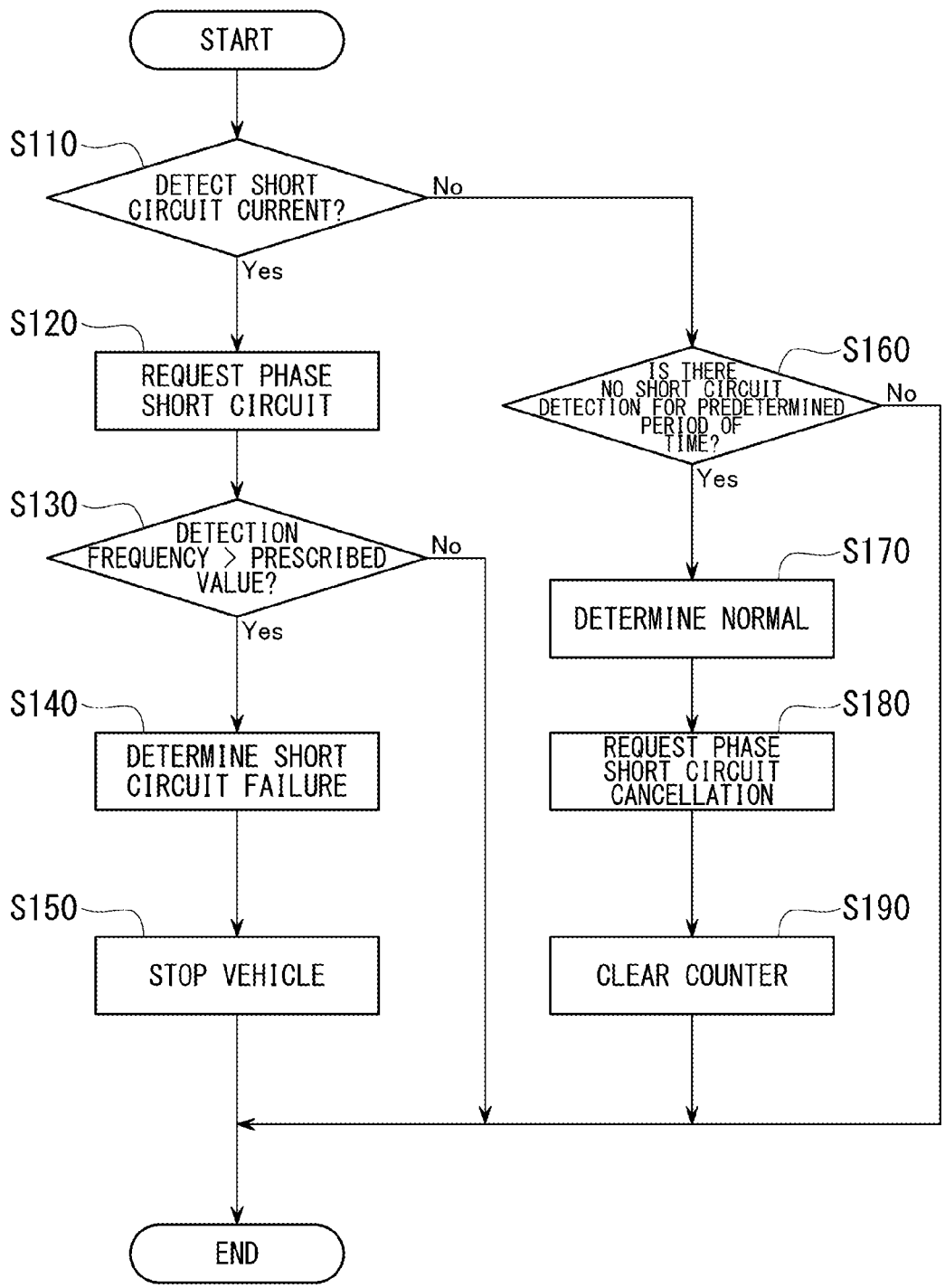
FIG. 2 is a view showing an example of an operation of a front motor control device according to the present embodiment.

FIG. 2 is a view showing an example of the operation of the front motor control device 110 according to the present embodiment. The front motor control device 110 repeatedly performs each step from a start to an end shown in FIG. 2 for each predetermined process cycle.

(Step S110) The detection part 111 detects a short circuit current flowing through the low-voltage-side switch 21L. When the short circuit current is detected (Step S110; YES), the detection part 111 adds one to a detection counter of the short circuit current and advances the process to Step S120. When the short circuit current is not detected (Step S110; NO), the detection part 111 advances the process to Step S160.

(Step S120) When the detection part 111 detects a short circuit current, the first control part 112 notifies the rear motor control device 210 that the short circuit current is detected. The notification of detecting the short circuit current means a request for a phase short circuit control to the rear motor control device 210. That is, the first control part 112 outputs a request for a phase short circuit control to the rear motor control device 210.

(Step S130) The first control part 112 determines whether or not the number of times of detecting the short circuit current by the detection part 111 exceeds a prescribed value. When the number of times (detection frequency) of detecting the short circuit current exceeds the prescribed value (Step S130; YES), the first control part 112 determines (short circuit determination) that a short circuit failure has occurred in the low-voltage-side switch 21L (Step S140) and performs a predetermined action (for example, stopping of the vehicle) (Step S150).

On the other hand, when the number of times (detection frequency) of detecting the short circuit current does not exceed the prescribed value (Step S130; NO), the first control part 112 ends the process without performing the processes from Step S140 to Step S150.

(Step S160) The first control part 112 determines whether or not a condition in which the short circuit current is not detected by the detection part 111 continues for a predetermined period of time. When it is determined that the condition in which the short circuit current is not detected by the detection part 111 continues for the predetermined period of time (Step S160; YES), the first control part 112 advances the process to Step S170. When it is determined that the condition in which the short circuit current is not detected by the detection part 111 does not continue for the predetermined period of time (Step S160; NO), the first control part 112 ends the process.

(Step S170) When the state in which the short circuit current is not detected continues for the predetermined period of time, the first control part 112 determines (normal determination) that a short circuit failure has not occurred in the low-voltage-side switch 21L (Step S170) and outputs a cancellation request of the phase short circuit control to the rear motor control device 210 (Step S180).

(Step S190) The first control part 112 clears (initializes) a short circuit failure determination counter such as a detection counter of the short circuit current and a non-detection counter of the short circuit current and ends the process.

[Operation of Rear Motor Control Device 210]

Figure 3:
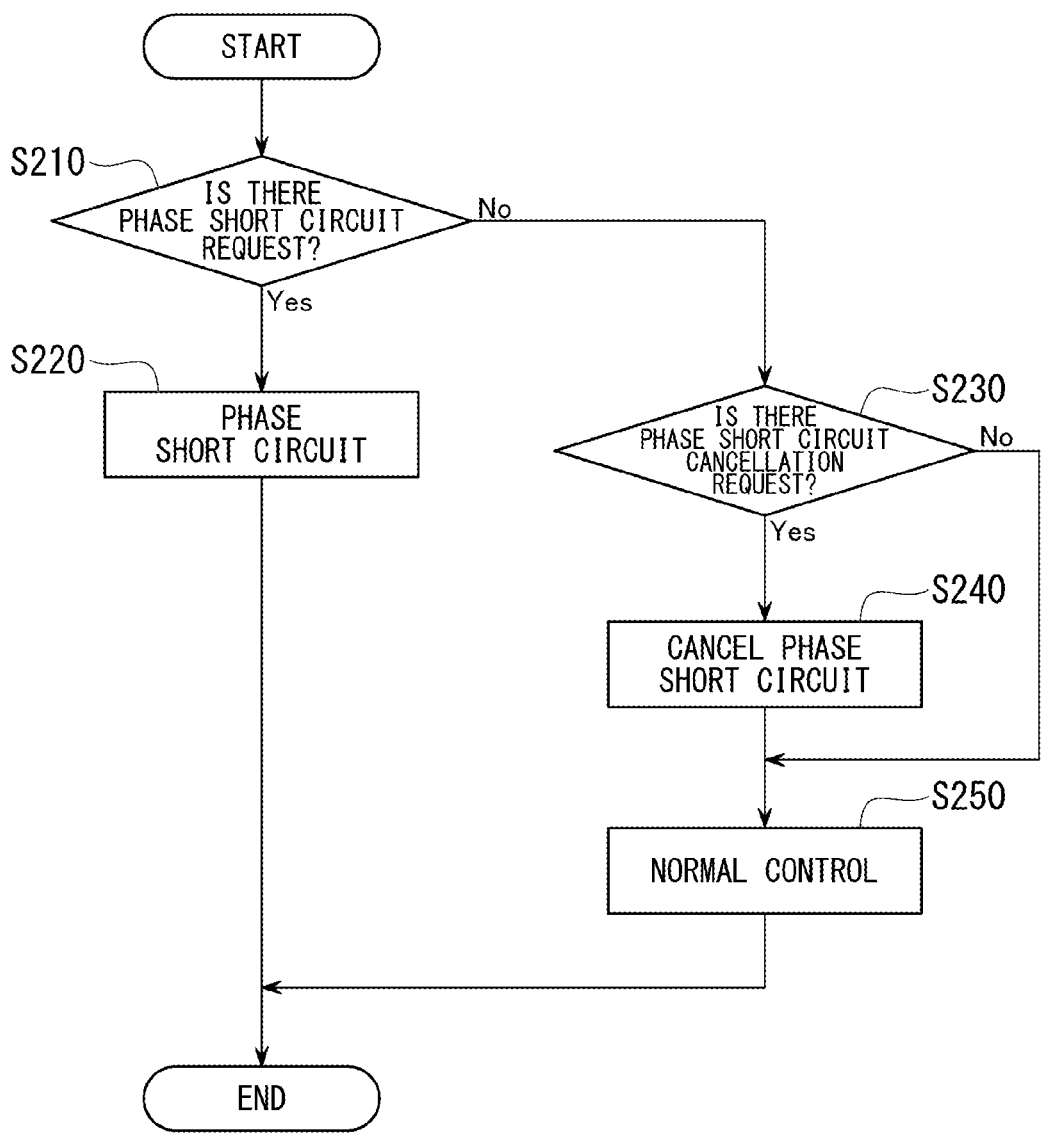
FIG. 3 is a view showing an example of an operation of a rear motor control device according to the present embodiment.

FIG. 3 is a view showing an example of the operation of the rear motor control device 210 according to the present embodiment. The rear motor control device 210 repeatedly performs each step from a start to an end shown in FIG. 3 for each predetermined process cycle.

(Step S210) The second control part 211 determines whether or not there is a request for a phase short circuit control from the front motor control device 110. When it is determined that there is the request for the phase short circuit control (Step S210; YES), the second control part 211 performs the phase short circuit control described above (Step S220). When it is determined that there is no request for the phase short circuit control (Step S210; NO), the second control part 211 advances the process to Step S230.

(Step S230) The second control part 211 determines whether or not there is a cancellation request of the phase short circuit control from the front motor control device 110. When it is determined that there is a cancellation request of the phase short circuit control (Step S230; YES), the second control part 211 cancels the phase short circuit control (Step S240) and performs a control (that is, a normal control) of the second inverter 32 of a case where the short circuit failure has not occurred. When it is determined that there is no cancellation request of the phase short circuit control (Step S230; NO), the second control part 211 performs the normal control described above.

A time-series flow of the control of the front motor control device 110 and the rear motor control device 210 described above is shown in FIG. 4.

Figure 4:
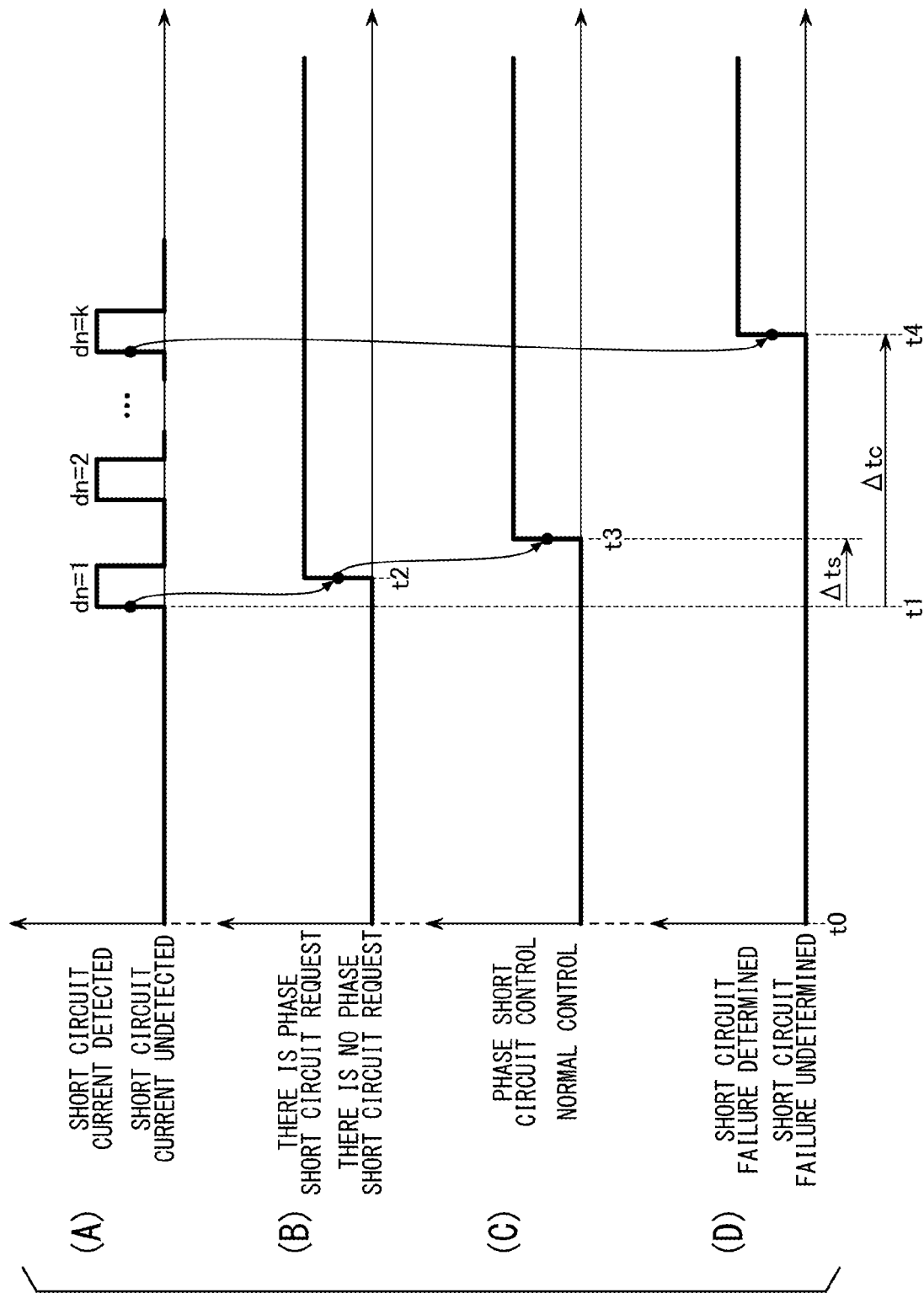
FIG. 4 is a view showing an example of a control flow of the present embodiment.

FIG. 4 is a view showing an example of a control flow of the present embodiment. As shown in FIG. 4(A), when a short circuit current is detected, the detection part 111 counts a detection frequency dn of the short circuit current. When the detection frequency dn reaches a predetermined value k, the detection part 111 determines that a short circuit failure of the low-voltage-side switch 21L has occurred and performs a predetermined action (for example, a vehicle stop) as shown in FIG. 4(D).

The predetermined value k specifies a time period from when the detection part 111 detects a short circuit current (a time point t1) to when a short circuit failure is determined (a time point t4), that is, a vehicle stop control start delay time $\Delta tc$. In order to prevent the occurrence of inconvenience such as stopping the vehicle in a situation where the vehicle should not stop due to erroneous detection of a short circuit current or the like, the vehicle stop control start delay time $\Delta tc$ is set to a time sufficient for preventing erroneous detection of the short circuit current and determining the occurrence of the short circuit failure.

As shown in FIG. 4(B), when a short circuit current is detected, the first control part 112 promptly performs a request of the phase short circuit control to the rear motor control device 210 (a time point t2). The term "immediately" means, for example, that the detection frequency dn of the short circuit current is less than the predetermined value k described above (for example, the detection frequency dn is one). The second control part 211 of the rear motor control device 210 performs the phase short circuit control (a time point t3 of FIG. 4(C)) upon receipt of the request of the phase short circuit control from the first control part 112. A time period from when the detection part 111 detects the short circuit current (the time point t1) to when the phase short circuit control starts (the time point t3), that is, a phase short circuit control start delay time $\Delta ts$, is set to a shorter time period than the vehicle stop control start delay time $\Delta tc$ described above.

As a result, according to the in-vehicle control apparatus 10, the phase short circuit control is started at a time earlier than the start of the vehicle stop control. That is, when the detection part 111 detects a short circuit failure of the high-voltage-side switch 21U, the second control part 211 performs the phase short circuit control prior to the stop control that stops the vehicle.

The above embodiment is described using an example in which the first control part 112 performs the request of the phase short circuit control when the detection frequency dn is one; however, the embodiment is not limited thereto. The first control part 112 may start the phase short circuit control by a detection frequency less than the predetermined value k. For example, in a case where the predetermined value k is ten, the first control part 112 may perform the request of the phase short control when the detection frequency dn is five.

Summary of Embodiment

Figure 6:
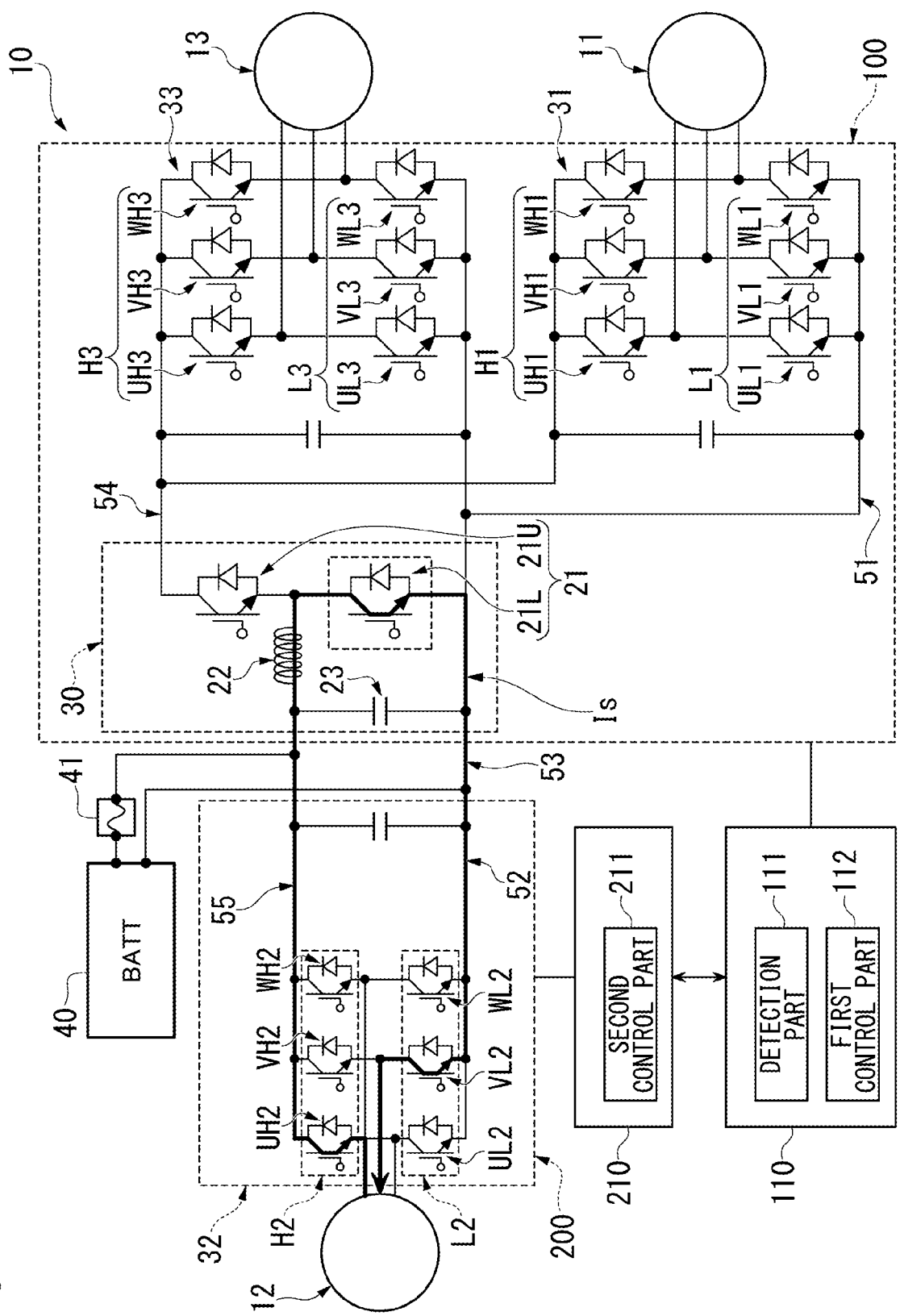
FIG. 6 is a view showing an example of a current path in a case where a short circuit failure has occurred in the related art.

FIG. 6 is a view showing an example of a current path in a case where a short circuit failure has occurred in the related art. When a short circuit failure has occurred in the low-voltage-side switch 21L, it is impossible to shut off a current even if the low-voltage-side switch 21L is controlled to be in an OFF state. Here, a regeneration electromotive force may be generated in the second motor 12 when a drive current is not supplied to the second motor 12 during traveling of the vehicle (for example, when not accelerating). In a case where a short circuit failure has occurred, when a short circuit current Is flows due to the regeneration electromotive force described above, the low-voltage-side switch 21L, a conductive component connected to the low-voltage-side switch 21L, or a cable between the second inverter and the DC-DC converter 30 may generate heat.

In a case where a short circuit failure has occurred in the low-voltage-side switch 21L, an ON resistance of the low-voltage-side switch 21L may become an indeterminate value. In this case, it is impossible to specify how much heat is generated in the low-voltage-side switch 21L, and the low-voltage-side switch 21L may enter an overheated state. Therefore, it is not preferable that the short circuit current Is continuously flows through the low-voltage-side switch 21L having the short circuit failure.

Figure 5:
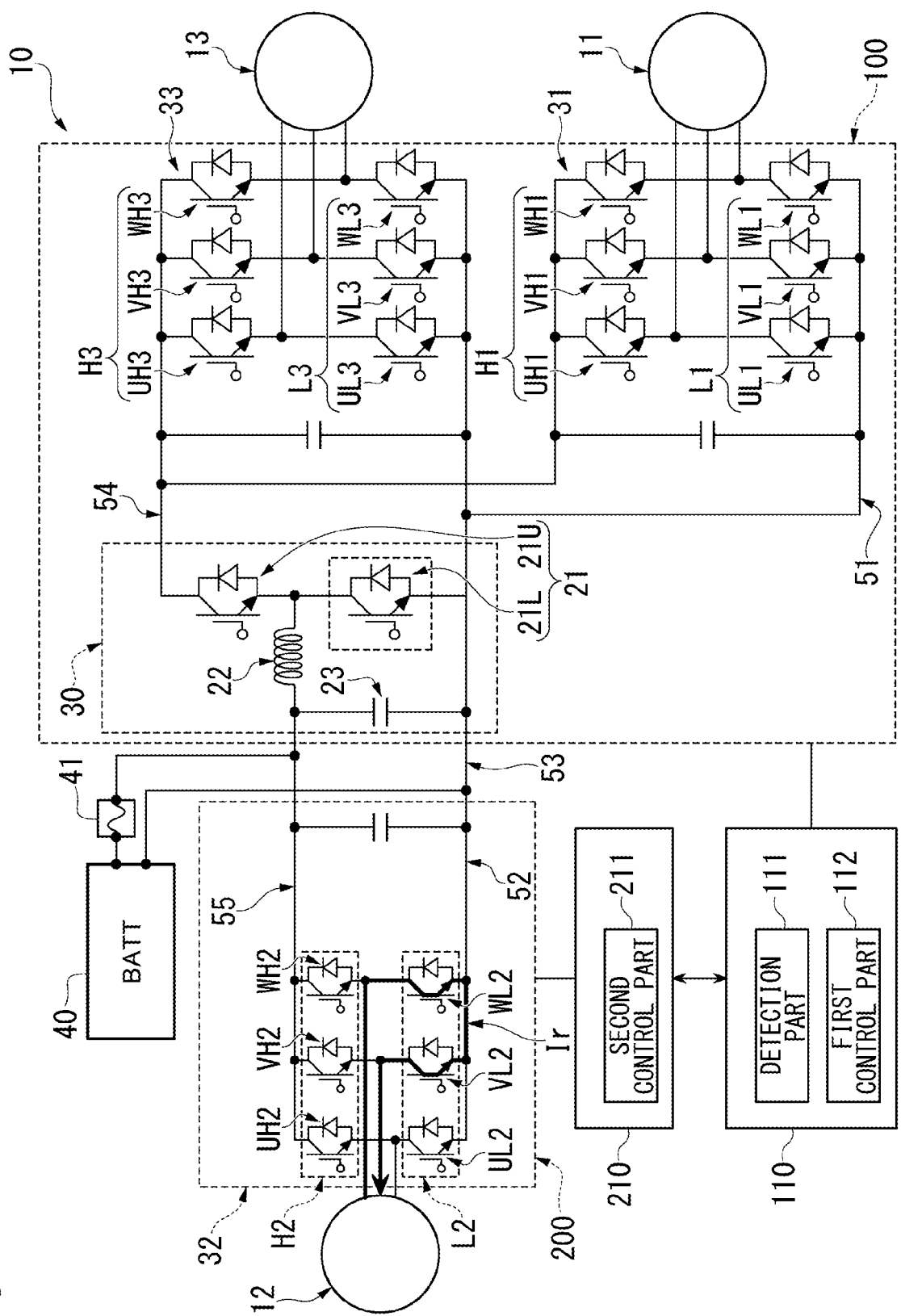
FIG. 5 is a view showing an example of a current path by a phase short circuit control of the in-vehicle control apparatus according to the present embodiment in a case where a short circuit failure has occurred.

FIG. 5 is a view showing an example of a current path by the phase short circuit control of the in-vehicle control apparatus 10 according to the present embodiment in a case where a short circuit failure has occurred. As described above, the in-vehicle control apparatus 10 performs a phase short circuit control when a short circuit failure has occurred in the low-voltage-side switch 21L. In an example of the present embodiment, the in-vehicle control apparatus 10 causes a three-phase short circuit by controlling all of the switches (the low-side U-phase switch UL2, the low-side V-phase switch VL2, and the low-side W-phase switch WL2) of the low-side arm L2 of the second inverter 32 to be in an ON state.

As shown in FIG. 5, when the phase short circuit control is performed, a current (regeneration current Ir) that flows by the regeneration electromotive force generated in the second motor 12 flows inside the second inverter 32, and therefore, flowing of the current into the low-voltage-side switch 21L is prevented.

According to the in-vehicle control apparatus 10 of the present embodiment, it is possible to prevent the regeneration current from flowing through the low-voltage-side switch 21L having a short circuit failure.

Further, the in-vehicle control apparatus 10 of the present embodiment performs the phase short circuit control prior to a vehicle stop control.

Thereby, the in-vehicle control apparatus 10 can secure a sufficiently long time for a time (the vehicle stop control start delay time Δtc) of determining whether or not the vehicle stop control is started and can prevent malfunction, and it is possible to prevent the low-voltage-side switch 21L from becoming an overheated state during that time.

Further, the in-vehicle control apparatus 10 of the present embodiment has a configuration in which the detection part 111 is a device having a separate body from the second inverter 32.

In the present embodiment, the DC-DC converter 30 is included in the front motor system 100, and the second inverter 32 is included in the rear motor system 200. From a viewpoint of a component layout inside the vehicle, it is desirable that the front motor system 100 is arranged at a front position of vehicle, and the rear motor system 200 is arranged at a rear position of the vehicle. Accordingly, the low-voltage-side switch 21L which is a detection target of the detection part 111 may be arranged at a front position of the vehicle, and the second inverter 32 that allows the regeneration current to flow into the low-voltage-side switch 21L may be arranged at a rear position of the vehicle.

That is, in this case, a failure region (the low-voltage-side switch 21L) and a current source (the second inverter 32) that allows a current to flow to the failure region are arranged separately at the front position and the rear position of the vehicle.

According to the in-vehicle control apparatus 10 of the present embodiment in which the detection part 111 and the second inverter 32 are devices having a separate body from each other, the detection part 111 can be arranged at a front position of the vehicle, and the second inverter 32 can be arranged at a rear position of the vehicle. That is, according to the in-vehicle control apparatus 10 of the present embodiment, it is possible to prevent the regeneration current from flowing through the low-voltage-side switch 21L having a short circuit failure while satisfying a requirement of the component layout inside the vehicle.

Although the embodiment of the present invention has been described with reference to the drawings, the present invention is not limited to the embodiment, and various modifications and substitutions can be made without departing from the scope of the present invention.

What is claimed is:

1. An in-vehicle control apparatus, comprising:
   a first inverter that drives a first motor for driving a vehicle;
   a second inverter that drives a second motor for driving the vehicle; and
   a voltage conversion part connected to and between the first inverter and the second inverter and configured to increase or decrease an operation voltage of one of the first inverter and the second inverter by an open-close control of a switch and supply the increased or decreased operation voltage as an operation voltage of another of the first inverter and the second inverter,
   wherein the voltage conversion part comprises:
      a reference voltage line that connects a low-voltage-side power line of the first inverter to a low-voltage-side power line of the second inverter;
      a low-voltage-side switch that is connected to and between the reference voltage line and a high-voltage-side power line of the second inverter; and
      a high-voltage-side switch that is connected to and between a high-voltage-side power line of the first inverter and the high-voltage-side power line of the second inverter, and
   the in-vehicle control apparatus comprises:
      a detection part that detects a short circuit failure of the low-voltage-side switch; and
      a control part that performs a phase short circuit control that short-circuits at least one of a plurality of low-voltage-side switches and a plurality of high-voltage-side switches of the second inverter upon detection of the short circuit failure of the low-voltage-side switch by the detection part.

2. The in-vehicle control apparatus according to claim 1, wherein the control part performs the phase short circuit control prior to a stop control that stops the vehicle upon detection of a short circuit failure of the high-voltage-side switch by the detection part.

3. The in-vehicle control apparatus according to claim 1, wherein the detection part is configured as a device having a separate body from the second inverter.

4. The in-vehicle control apparatus according to claim 2, wherein the detection part is configured as a device having a separate body from the second inverter.

5. A non-transitory computer-readable recording medium including a program that causes a computer of an in-vehicle control apparatus, comprising:
   a first inverter that drives a first motor for driving a vehicle;
   a second inverter that drives a second motor for driving the vehicle; and
   a voltage conversion part that is connected to and between the first inverter and the second inverter and comprises a reference voltage line that connects a low-voltage-side power line of the first inverter to a low-voltage-side power line of the second inverter, a low-voltage-side switch that is connected to and between the reference voltage line and a high-voltage-side power line of the second inverter, and a high-voltage-side switch that is connected to and between a high-voltage-side power line of the first inverter and a high-voltage-side power line of the second inverter, the voltage conversion part being configured to increase or decrease an operation voltage of one of the first inverter and the second inverter by an open-close control of a switch and supply the increased or decreased operation voltage as an operation voltage of another of the first inverter and the second inverter,
to execute:
a detection step of detecting a short circuit failure of the low-voltage-side switch; and
a control step of performing a phase short circuit control that short-circuits at least one of a plurality of low-voltage-side switches and a plurality of high-voltage-side switches of the second inverter upon detection of a short circuit failure of the low-voltage-side switch in the detection step.

* * * * *